United States Patent [19]

Mozar et al.

[11] Patent Number: 5,510,944
[45] Date of Patent: Apr. 23, 1996

[54] POWER SUPPLY OVER-VOLTAGE PROTECTION

[75] Inventors: Stefan G. Mozar, Singapore, Singapore; Tijmen C. Van Bodegraven, Eindhoven, Netherlands

[73] Assignee: U.S. Philips Corporation, New York, N.Y.

[21] Appl. No.: 435,308

[22] Filed: May 5, 1995

[51] Int. Cl.$^6$ .................................................. H02H 7/10
[52] U.S. Cl. ........................... 361/18; 361/91; 363/61; 363/50
[58] Field of Search ....................... 361/91, 18, 56; 363/61, 50, 53

[56] References Cited

U.S. PATENT DOCUMENTS

| | | | |
|---|---|---|---|
| 3,893,006 | 7/1975 | Algeri et al. | 361/18 |
| 4,780,809 | 10/1988 | Chewak et al. | 361/91 |

FOREIGN PATENT DOCUMENTS

| | | | |
|---|---|---|---|
| 1185133 | 7/1989 | Japan | H02H 11/00 |

OTHER PUBLICATIONS

Sanken Electric Company, Ltd. publication SSE–17284E., no date.

*Primary Examiner*—Todd Deboer
*Attorney, Agent, or Firm*—Edward W. Goodman

[57] ABSTRACT

A voltage doubler (2) having a series arrangement of two smoothing capacitors (C1,C2), is able to use less expensive smoothing capacitors (C1,C2) having a far lower rated voltage which is only slightly above the maximum voltage occurring during normal operation. To this end, a first and a second over-voltage prevention circuit (30,31) are coupled across the smoothing capacitors (C1,C2) of the voltage doubler (2) to protect the smoothing capacitors (C1,C2) against over-voltage if one of the smoothing capacitors (C1,C2) is short-circuited. The first and the second over-voltage prevention circuit (30,31) may both be an over-voltage detector, or an under-voltage detector each being coupled across one of the smoothing capacitors (C1,C2). It is also possible to combine an over-voltage detector coupled across one of the smoothing capacitors (C1,C2) to an under-voltage detector coupled across the same smoothing capacitor (C1,C2). The over-voltage detector prevents an over-voltage across said one smoothing capacitor (C1,C2) if the other smoothing capacitor (C1,C2) is short-circuited. The under-voltage detector detects a short circuit of the one smoothing capacitor (C1,C2) and thereby prevents an over-voltage across the other.

11 Claims, 3 Drawing Sheets

POWER SUPPLY OVER-VOLTAGE PROTECTION

BACKGROUND OF THE INVENTION

1. Field of the Invention

The invention relates to a power supply input circuit comprising a disconnecting circuit coupled to receive an AC-input voltage and a disconnecting signal for disconnecting the AC-input voltage from output terminals of the disconnecting circuit if the disconnecting signal is active, a series arrangement of a first and a second smoothing capacitor coupled between output terminals of the power supply input circuit, a voltage doubler circuit coupled to said output terminals for supplying a rectified output voltage across the series arrangement of the first and the second smoothing capacitor in a first situation where no voltage doubling is required, and for supplying one polarity of the AC-input voltage across said first smoothing capacitor and the other polarity of the AC-input voltage across said second smoothing capacitor, to provide a doubled rectified output voltage across the series arrangement of the first and the second smoothing capacitor in a second situation where a voltage doubling is required, and an over-voltage detection circuit having an output for supplying the disconnecting signal.

The invention also relates to an over-voltage protection method of protecting smoothing capacitors in a voltage doubler, the voltage doubler receiving an AC-input voltage and comprising a series arrangement of two smoothing capacitors coupled between output terminals of the voltage doubler, while in a first situation where no voltage doubling is required, the voltage doubler supplies a rectified output voltage across the series arrangement of the two smoothing capacitors, and in a second situation where a voltage doubling is required, the voltage doubler supplies one polarity of the AC-input voltage across one of the smoothing capacitors and supplies the other polarity of the AC-input voltage across the other smoothing capacitor to provide a doubled rectified voltage across the series arrangement of the two smoothing capacitors, the method comprising the steps of: detecting an over-voltage, generating an active disconnecting signal if an over-voltage is detected, and disconnecting the AC-input voltage from the voltage doubler in response to the active disconnecting signal.

A power supply input circuit comprising a voltage doubler and an over-voltage circuit may be used, for example in apparatuses which have to operate on a large range of AC-input voltages. Low AC-input voltages being about a magnitude of two lower than high AC-input voltages may occur in this large range of AC-input voltages. Doubling the low AC-input voltages with the voltage doubler causes a smaller input voltage range of a stabilizing power supply succeeding the power supply input circuit.

2. Description of the Related Art

Such a power supply input circuit is known from JP-A-1-185,133. The known power supply input circuit comprises rectifier diodes arranged in a full-wave rectifier bridge, this bridge having two output terminals which are connected to a series arrangement of two smoothing capacitors. The voltage across the series arrangement of the two smoothing capacitors is the output voltage of the power supply input circuit. The full-wave rectifier bridge further comprises two input terminals, one of which is connected to one terminal of an AC-input voltage source via a fuse. At high AC-input voltages (for example, 220 V) the other input terminal of the full-wave rectifier bridge is connected to the other terminal of the AC-input voltage source via a switch being in a first position, to supply a full-wave rectifier AC-input voltage to the output terminals of the power supply input circuit. At low AC-input voltages (for example, 110 V) the switch is in a second position to connect the other terminal of the AC-input voltage source to a connection node of the two smoothing capacitors to supply a doubled AC-input voltage to the output terminals of the power supply input circuit (the other terminal of the full-wave rectifier bridge is not connected, and only two rectifier diodes are operational). An avalanche diode is connected in parallel to each smoothing capacitor. If the switch is erroneously in the second position at high AC-input voltages, an over-voltage on the smoothing capacitors is prevented because the avalanche diodes will start conducting, thereby causing a large short-circuit current that blows the fuse. A drawback of the known power supply input circuit is that the rectifier diodes have to cope with the large short circuit current. An over-voltage is herein understood to be a voltage higher than the rated voltage of the smoothing capacitors. The rated voltage is the maximum operating voltage the smoothing capacitors are designed for.

Such a power supply input circuit is also known from a Sanken Electric Company publication SSE-17284E which describes an application circuit of a voltage doubler Integrated Circuit STR81000A. This known circuit again comprises a fuse, rectifier diodes arranged in a full wave rectifier bridge, a semiconductor switch, and two smoothing capacitors, arranged and operating in the same way as described above. The integrated circuit comprises the switch and electronics to determine the right position of the switch depending on the level of the AC-input voltage. Over-voltage on the smoothing capacitors as a consequence of a wrong position of the switch at a high AC-input voltage is now prevented by causing a thyristor to conduct if a too high voltage across the series arrangement of the smoothing capacitors is detected. As the thyristor precedes the rectifier bridge, a large short circuit current for blowing a fuse will not flow through the rectifier diodes. Thus, this known power supply input circuit solves the problem of the first-mentioned known power supply input circuit, but has the drawback that a short circuit of only one of the smoothing capacitors is not detected. In that case a voltage (for example, 390 V) which is far higher than the rated voltage (for example, 250 V) of the smoothing capacitors will occur across the smoothing capacitor which is not short-circuited. Such a high voltage can cause a breakdown of this smoothing capacitor in a dangerous way.

SUMMARY OF THE INVENTION

Starting from the last-mentioned prior art it is, inter alia, an object of the invention to provide a power supply input circuit comprising an over-voltage detection circuit which also prevents a dangerous situation if an over-voltage occurs on only one of the smoothing capacitors, without causing a large current through rectifier means for rectifying an AC-input voltage.

The power supply input circuit in accordance with the invention is characterized in that the over-voltage detection circuit comprises a first over-voltage prevention circuit to detect an over-voltage across said first smoothing capacitor, and a second over-voltage prevention circuit to detect an over-voltage across said second smoothing capacitor, the over-voltage detection circuit activating the disconnecting signal if an overvoltage is detected across at least one of said smoothing capacitors.

An over-voltage protection method of protecting smoothing capacitors in a voltage doubler is characterized in that the detection of the over-voltage situation comprises the steps of: detecting an over-voltage across said first smoothing capacitor, detecting an over-voltage across said second smoothing capacitor, and furnishing said disconnecting signal if an over-voltage across at least one of said first and said second smoothing capacitors is detected.

A voltage-doubler receives an AC-input voltage, and comprises a first and a second smoothing capacitor arranged in series between output terminals of the power supply input circuit. The voltage doubler can be built up as described in the recited prior art. The rectifier diodes can be replaced by other rectifier elements (for example thyristors), and need not be arranged as a full-wave rectifier bridge: also at high AC-input voltages a half-wave rectifier arrangement can be used, comprising, for example, one rectifier element. Independent of the construction of the voltage doubler, the output terminals of the power supply input circuit supply a rectified AC input voltage across the series arrangement of the first and the second smoothing capacitor if the AC-input voltage is above a certain input level (for example, AC-input voltages in the range from 160 V to 276 V), or the sum (so substantially a doubling of the AC-input voltage) of a rectified positive polarity of the AC-input voltage across one of the smoothing capacitors added to the rectified negative polarity of the AC-input voltage across the other smoothing capacitor if the AC-input voltage is below a certain level (for example, AC-input voltages in the range from 85 V to 140 V). In accordance with the present invention, the over-voltage detection circuit comprises a first and a second over-voltage prevention circuit to prevent an over-voltage across both smoothing capacitors. The over-voltage detection circuit activates the disconnecting signal if the first or the second over-voltage prevention circuit detects an over-voltage across a related smoothing capacitor.

An over-voltage prevention circuit may be an over-voltage detector which is coupled across the smoothing capacitor, across which the over-voltage has to be detected to supply an over-voltage signal for activating the disconnecting signal if an over-voltage level is exeeded. The over-voltage level has a value above the maximum voltage occurring on the smoothing capacitor during normal operation and below the rated voltage of this smoothing capacitor. An over-voltage occurs on one of the smoothing capacitors if the other smoothing capacitor has been a short-circuited, for example, due to ageing or overload.

An over-voltage prevention circuit may also be an under-voltage detector coupled across the smoothing capacitor across which the under-voltage has to be detected to supply an under-voltage signal for activating the disconnecting signal if the voltage across this smoothing capacitor is below a certain low level. The low level is chosen below the minimal voltage across a smoothing capacitor in normal operation and above a short-circuit voltage occurring across a short-circuited smoothing capacitor. In this way, an over-voltage across the smoothing capacitor which is not short-circuited is prevented by detecting a short circuit of the other smoothing capacitor.

To prevent an over-voltage across each of the smoothing capacitors, three configurations are possible: an over-voltage detector is coupled across each of the smoothing capacitors an under-voltage detector is coupled across each of the smoothing capacitors or an over-voltage detector is coupled across one of the smoothing capacitors and an under-voltage detector is coupled across the same one of the smoothing capacitors.

The voltage doubler will be disconnected from the AC-input voltage source by a disconnecting circuit if the disconnecting signal is activated.

An embodiment of the power supply input circuit in accordance with the invention has the advantage that an over-voltage across each of the smoothing capacitors is detected directly by over-voltage detectors being coupled across each of the smoothing capacitors.

Another embodiment of the power supply input circuit in accordance with the invention has the advantage that the under-voltage detectors have a simple and cheap construction.

A further embodiment of the power supply input circuit in accordance with the invention has the advantage that both the over-voltage detector and the under-voltage detector are coupled across the same smoothing capacitor. In this way, the disconnecting signal can be activated by a simple combination of the over-voltage signal and the under-voltage signal to avoide bridging the large voltage difference between related connections of the first and the second smoothing capacitor.

A further embodiment of the power supply input circuit in accordance with the invention is characterized by coupling one of the connections of the first capacitor to ground, the combination of the over-voltage signal and the under-voltage signal yields a disconnecting signal with reference to ground. This disconnecting signal can then be easily used to activate the disconnecting circuit. This is especially the case if the disconnecting circuit comprises a fuse arranged between the AC-input voltage source and an input terminal of the voltage doubler and a thyristor coupled between this input terminal of the voltage doubler and ground, the cathode of the thyristor being coupled to ground. An active disconnecting signal with respect to ground can easily trigger the thyristor to become conductive so as to blow the fuse. The large short-circuit current which flows through the fuse and the thyristor does not flow through the elements of the voltage doubler circuit.

A further embodiment of the power supply input circuit in accordance with the invention is characterized in that the over-voltage detector comprises a parallel arrangement of a zener diode and a third resistor, the parallel arrangement being coupled across one of the smoothing capacitors, in that a base of a bipolar transistor is coupled to a junction of the two resistors, and an emitter of the bipolar transistor is coupled to a junction of the third resistor, and in that the zener diode is oriented in such a way that an emitter current flowing in the emitter of the bipolar transistor flows from cathode to anode of the zener diode, and in that a collector of the bipolar transistor is connected to the output of the over-voltage detection circuit to supply the disconnecting signal. In this embodiment a compensation of the temperature-coefficient of the bipolar transistor and that of the zener-diode is achieved, thereby gaining a stabler over-voltage trigger level.

In a further embodiment of the power supply input circuit in accordance with the invention, the over-voltage detection circuit is adapted so that no over-voltage detection will occur if the duration of the over-voltage is too short to cause a failure of one of the smoothing capacitors.

A second aspect of the invention provides a picture display apparatus comprising a power supply input circuit as described above, a main power supply coupled to the output terminals of the power supply input circuit to supply at least one stabilized output voltage, and a horizontal addressing circuit receiving said stabilized output voltage to supply a horizontal addressing signal for determining a horizontal position on a display device and a vertical addressing signal for determining a vertical position on the display device. The limiting of the maximum voltage across the smoothing capacitors by the over-voltage prevention circuits also limits the maximum voltage at the output terminals of the power supply input circuit and thereby reduces the over-voltage voverload on a succeeding power supply. This power supply may be more reliable and cheaper. Furthermore the input voltage range of the succeeding power supply is much smaller, which enables a better stabilisation of output voltages or a simpler design of the power supply.

BRIEF DESCRIPTION OF THE DRAWINGS

The foregoing and other aspects of the invention will now be described in more detail by way of example with reference to the accompanying drawings, in which.

DESCRIPTION OF THE PREFERRED EMBODIMENTS

Figure 1:
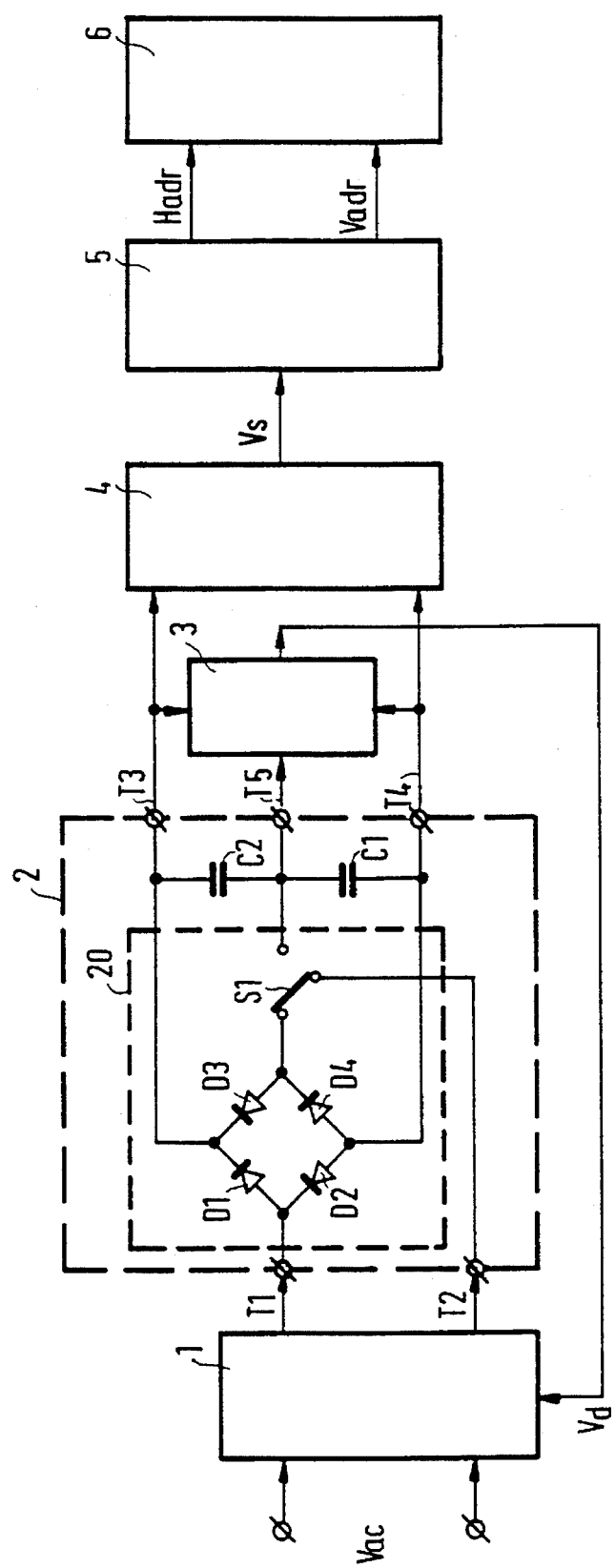
FIG. 1 shows a basic block diagram of a picture display apparatus comprising a power supply input circuit according to the invention.

FIG. 1 shows a basic block diagram of a picture display apparatus comprising a power supply input circuit 1,2,3 according to the invention. A disconnecting circuit 1 is coupled to receive an AC-input voltage Vac and a disconnecting signal Vd for disconnecting the AC-input voltage from output terminals T1,T2 of the disconnecting circuit 1 if the disconnecting signal Vd is active. A voltage-doubler 2 comprises a voltage doubler circuit 20 coupled to the output terminals T1,T2 of the disconnecting circuit 1. The voltage doubler circuit 20 has a first doubler output terminal T3 which is a first output terminal of the power supply input circuit, a second doubler output terminal T4 which is a second output terminal of the power supply input circuit, and a third doubler output terminal T5. The voltage doubler 2 further comprises a first and a second smoothing capacitor C1,C2 arranged in series between the first and the second doubler output terminals T3,T4. The first smoothing capacitor C1 is coupled between the doubler output terminals T4,T5. The second smoothing capacitor C2 is coupled between the doubler output terminals T3,T5. An overvoltage detection circuit 3 is coupled to two of the doubler output terminals T3,T4,T5, if an over-voltage detector and an under-voltage detector is used, both being coupled across the same one of the smoothing capacitors C1,C2. The over-voltage detection circuit 3 is coupled to all three doubler output terminals T3,T4,T5, if an over-voltage detector or an under-voltage detector is coupled across each smoothing capacitor C1,C2. The over-voltage detection circuit 3 supplies the disconnecting signal Vd to the disconnecting circuit 1. The disconnecting signal Vd is active if a voltage across the first or the second smoothing capacitor C1,C2 is higher than a maximum permissible value. This maximum permissible value is chosen above the maximum voltage occurring on each smoothing capacitor during normal operation of the power supply input circuit and below the rated voltage of each smoothing capacitor.

The disconnecting circuit 1 comprises, for example, a fuse arranged in series with an AC voltage source Vac and an element for generating a large current through the fuse (for example, a thyristor coupled between the fuse and ground) to disconnect the voltage doubler 2 from the AC-voltage source Vac.

The voltage doubler circuit 20 comprises four rectifying elements D1,D2,D3,D4 arranged in a bridge configuration and a switch S1 having two positions. The way in which this voltage doubler circuit operates is not further elucidated, as it is known from the prior art.

A main power supply 4 is coupled to the output terminals T3,T4 of the power supply input circuit 1,2,3 to supply at least one sufficiently stabilized supply-voltage Vs to an addressing stage 5. The addressing stage 5 supplies horizontal addressing information Hadr and vertical addressing information Vadr to a picture device 6 for determining a horizontal and a vertical position on a picture display screen of the picture device 6.

If the voltage doubler 2 is in the doubling mode and one of the smoothing capacitors C1,C2 is short-circuited, a very large short-circuit current will flow through the short-circuited smoothing capacitor C1,C2, the conducting rectifier diode D1,D2,D3,D4 and the disconnecting circuit 1. This large short-circuit current can also be used to activate the disconnection of the voltage doubler 2 from the AC-input voltage source Vac (for example by blowing a fuse arranged between the AC-input voltage source Vac and one of the input terminals T1,T2 of the voltage doubler 2). Thus, no over-voltage detection across each of the smoothing capacitors C1, C2 is necessary.

If the voltage doubler 2 is not in the doubling mode, the two smoothing capacitors C1,C2 are arranged in series, and no large short-circuit current will flow through the series arrangement of the two smoothing capacitors C1,C2 if one of the smoothing capacitors C1,C2 is short-circuited. Consequently, a fuse arranged as mentioned above will not disconnect. In this case, the rectified voltage occurring in normal operation across the series arrangement of the smoothing capacitors C1,C2 now occurs only across the smoothing capacitor C1 or C2 which is not short-circuited. This would be no problem if expensive smoothing capacitors C1,C2 having a high rated voltage specification were selected (400 V if the maximum AC input voltage Vac is 276 V). By selecting a rated voltage of 250 V for each smoothing capacitor C1,C2, cheaper smoothing capacitors can be used, but then a protection against an over-voltage (400 V if one of the smoothing capacitors is short-circuited) across the smoothing capacitors C1,C2 is necessary. As in normal operation the voltage across each smoothing capacitor is about 200 V, the area between 200 V and 250 V can be used to detect an over-voltage situation.

Figure 2:
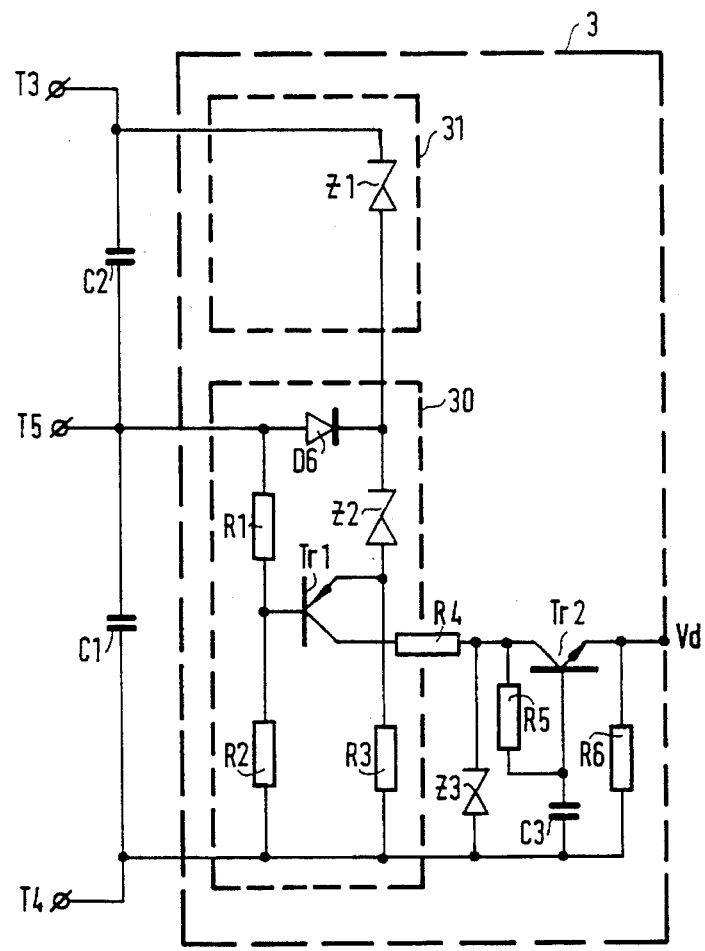
FIG. 2 shows an embodiment of an over-voltage detection circuit according to the invention.
Figure 3:
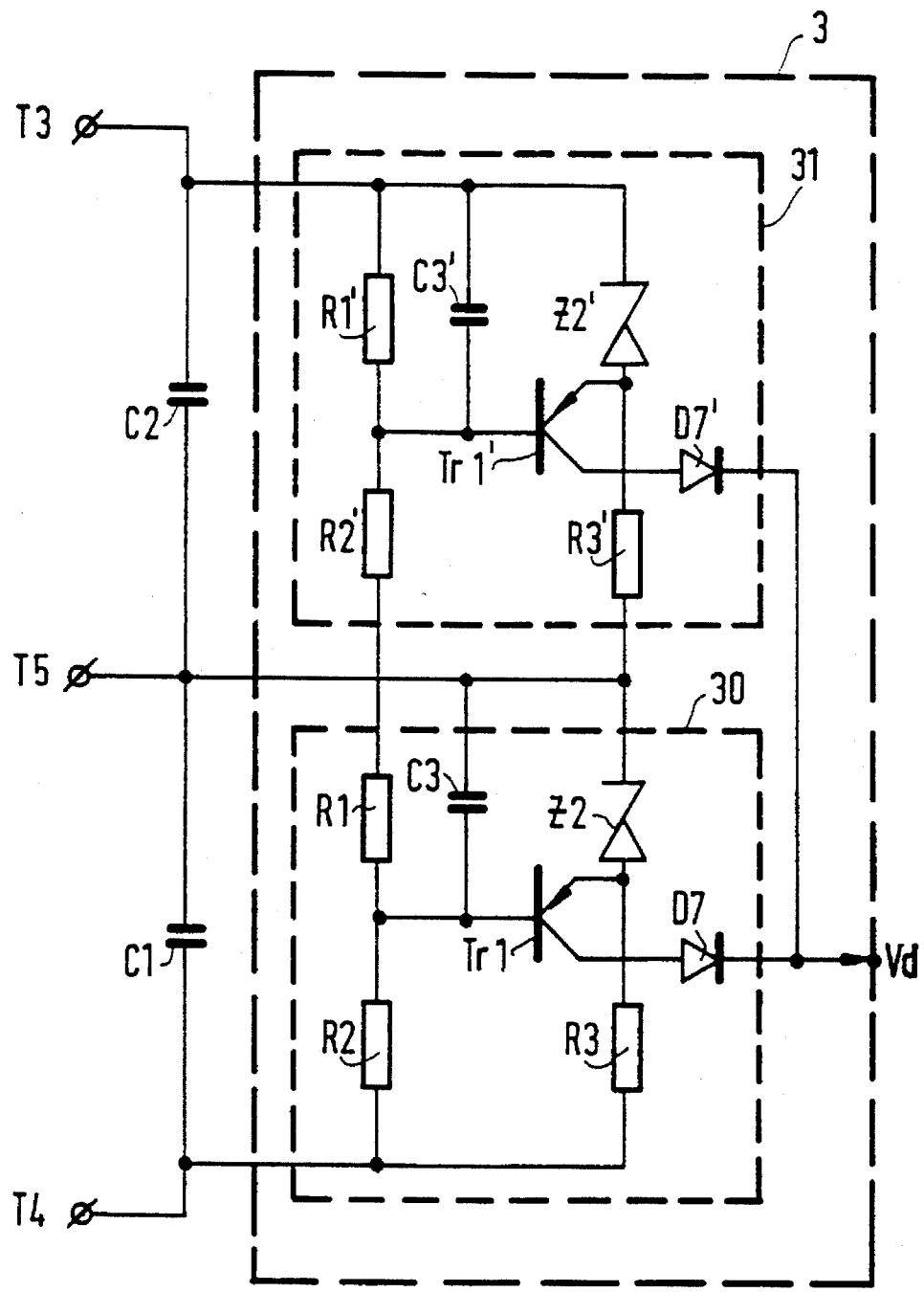
FIG. 3 shows another embodiment of an over-voltage detection circuit according to the invention.

FIGS. 2 and 3 show embodiments of an over-voltage detection circuit 3 according to the invention. In these embodiments, a first over-voltage prevention circuit 30 is coupled across the first smoothing capacitor C1, and a second over-voltage prevention circuit 31 is coupled across the second smoothing capacitor C2. Both the first and the second overvoltage prevention circuits 30,31 are an over-voltage detector.

In FIG. 2, the first over-voltage prevention circuit 30 comprises a second zener diode Z2, a second diode D6, a bipolar transistor Tr1, and a first, a second and a third resistor R1,R2,R3. The second detector 31 comprises a first zener diode Z1 having a cathode which is coupled to the first doubler output terminal T3, and an anode which is coupled to a junction of a cathode of the second diode D6 and a cathode of the second zener diode Z2. An anode of the second diode D6 is coupled to the third doubler output terminal T5. An anode of the second zener diode Z2 is coupled to an emitter of the bipolar pnp transistor Tr1 and to the third resistor R3. The other side of the third resistor R3 is coupled to the second doubler output terminal T4. The first resistor R1 is coupled between the anode of the second diode D6 and a base of the bipolar pnp transistor Tr1. The second resistor R2 is coupled between the base of the bipolar pnp transistor Tr1 and the second doubler output terminal T4. A collector of the bipolar transistor Tr1 is coupled to supply an intermediate disconnecting signal Vd'.

The intermediate disconnecting signal Vd' becomes active if the bipolar pnp transistor Tr1 is turned on, which is the case if the voltage across the first smoothing capacitor C1 exceeds a certain level, or when the first zener diode Z1 becomes conducting, which is the case if the voltage across the second smoothing capacitor C2 exceeds a certain level. This level is chosen between the rated voltage of the smoothing capacitors C1,C2 (250 V) and the maximum voltage (200 V) across one of the smoothing capacitors C1,C2 in normal non-doubling operation of the voltage doubler 2. Consequently, the zener voltage of the first zener diode Z1 (which may be a series arrangement of zener diodes) could be selected to be 225 V. The values of the components of the first over-voltage prevention circuit 30 could be R1=10 kohms, R2=135 kohms, zener voltage VZ2=15 V, so that the certain level is Vtr=(2*Vbe+VZ2)*(R1+R2)/R1=237,8 V, wherein 2*Vbe=1.4 V is constituted by the base-emitter voltage of the first transistor Tr1 and the voltage across the second diode D6.

An over-voltage across the smoothing capacitor C1,C2 is allowed to occur during a short period without causing the smoothing capacitor C1,C2 to fall. Such an overvoltage during a short period can be caused, for example, by a sudden increase of a mains voltage, as is the case after a mains dip or during a mains spike. It is an advantage if the over-voltage detection does not become active in these situations. A simple solution is obtained by adding a smoothing circuit R5,C4 for supplying an active disconnecting signal Vd if the intermediate disconnecting signal Vd' is active during a sufficiently long period. To achieve this, a fourth resistor R4 is connected between the collector of the bipolar pnp transistor Tr1 and a junction of a cathode of a second zener diode Z3, a collector of a bipolar npn transistor Tr2 and a fifth resistor R5. A base of the bipolar npn transistor Tr2 is coupled to a junction of a capacitor C3 and a unconnected end of the fifth resistor 1t5. An emitter of the bipolar npn transistor Tr2 supplies the disconnecting signal Vd and is coupled to a sixth resistor R6. An anode of the second zener diode Z3, a unconnected end of the capacitor C3, and a unconnected end of the sixth resistor R6 are coupled to ground. The fourth resistor R4 and the second zener diode Z3 limit the voltage on the collector of the bipolar npn transistor Tr2. The fifth resistor R5 and the third capacitor C3 cause the disconnecting signal Vd to become active only if the intermediate disconnecting signal Vd' is active during a period which is long enough to charge the capacitor C3.

In FIG. 3, the first over-voltage prevention circuit 30 is essentially the same as that described in FIG. 2, but the second diode D6 is replaced by a short circuit, a capacitor C3 is connected between the base of the bipolar pnp transistor and the cathode of the zener diode Z2, and a further diode D7 is added and has an anode coupled to the collector of the pnp transistor Tr1 and a cathode coupled to an output terminal of the first over-voltage prevention circuit 30. The second over-voltage prevention circuit 31 is the same circuit as the first over-voltage prevention circuit 30 of FIG. 3. Elements of the second over-voltage prevention circuit 31 are indicated by the same reference numerals as corresponding elements of the first over-voltage prevention circuit 30, but followed by an apostrophe. An output terminal of the second over-voltage prevention circuit 31 is coupled to the output terminal of the first over-voltage prevention circuit 30 to supply a disconnecting signal Vd. The disconnecting signal Vd becomes active if a certain level across one of the smoothing capacitors is crossed, as explained in the description of FIG. 2. An advantage of this embodiment is a more accurate over-voltage detection by having a resistive divider R1',R2',R1,R2 across the series arrangement of the smoothing capacitors C1,C2. By using the resistive divider, the voltage division across the smoothing capacitors C1,C2 is no longer dependent on a large spread of the values of the smoothing capacitors C1,C2. As an over-voltage across a smoothing capacitor C1,C2 is allowed to occur during a short period, the capacitors C3,C3' are added. A sudden increase of a voltage across a smoothing capacitor C1,C2 will also occur across the capacitor C3,C3', thereby preventing the bipolar pnp transistor from starting being turned on immediately.

Figure 4:
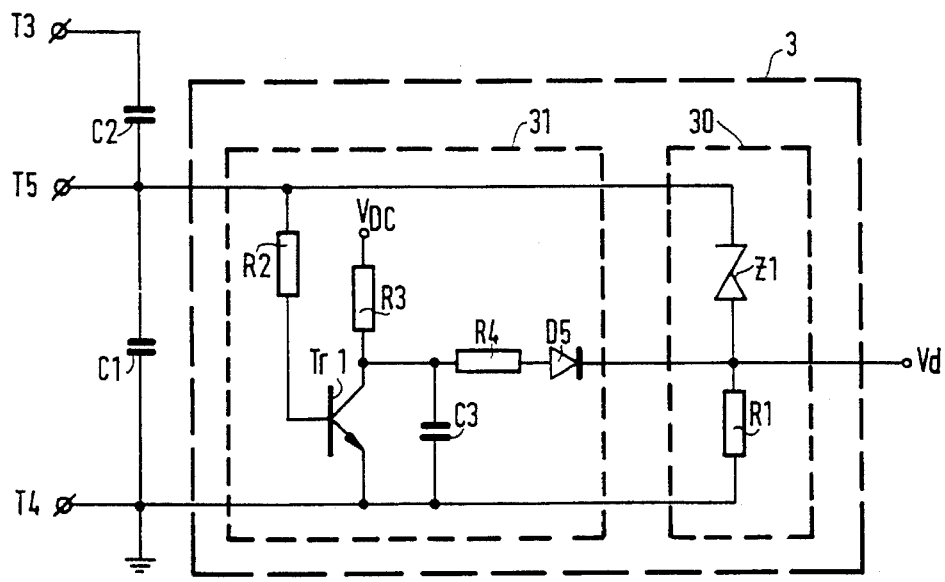
FIG. 4 shows yet another embodiment of an over-voltage detection circuit according to the invention.

FIG. 4 shows another embodiment of an over-voltage detection circuit 3 according to the invention. The first over-voltage prevention circuit 30 is again an over-voltage detector coupled across the first smoothing capacitor C1 which may contain the same circuit as the first over-voltage prevention circuit 30 as described in the embodiment of FIG. 3. In this case the first over-voltage prevention circuit 30 comprises a zener diode Z1 having a cathode coupled to the third doubler output terminal T5 and an anode coupled to a junction of a resistor R1 and an output terminal to supply the disconnecting signal Vd. The other end of the resistor R1 is coupled to ground. The disconnecting signal becomes active if the voltage across the first smoothing capacitor C1 crosses a zener voltage of the zener diode Z1. The first over-voltage prevention circuit 30 detects an over-voltage across the first smoothing capacitor C1 caused by a short-circuited second smoothing capacitor C2. The second over-voltage prevention circuit 31 is an under-voltage detector coupled across the first smoothing capacitor C1 to detect a short circuit of the first smoothing capacitor C1 for preventing an over-voltage on the second smoothing capacitor C2. The second over-voltage prevention circuit 31 comprises a first resistor R2 coupled between the third doubler output terminal T5 and a base of a bipolar npn transistor Tr1. A collector of the bipolar npn transistor Tr1 is coupled to a second resistor R3 and to a third capacitor C3. An emitter of the bipolar npn transistor and another side of the third capacitor C3 are coupled to the second doubler output terminal T4 which is coupled to ground. Another end of the second resistor R3 is coupled to a suitable voltage supply source Vb. A diode D5 has an anode coupled to the other side of the second resistor R3 and a cathode coupled to the output terminal of the first over-voltage prevention circuit 30 to supply the disconnecting signal Vd. At the instant when the first smoothing capacitor C1 is a short-circuited the bipolar npn transistor Tr1 will be turned off, thereby activating the disconnecting signal Vd so as to prevent an over-voltage from occurring across the second smoothing capacitor C2.

It will be evident that variants of the embodiments described are possible within the scope of the invention. For example, pnp transistor Tr1 ,Tr1' used in an over-voltage detector could as well be a npn transistor having an emitter coupled to a doubler output terminal T4,T5 via a zener diode Z2,Z2'. Also npn transistor Tr1 used in an under-voltage detector could as well be a pnp bipolar transistor having an emitter coupled to one of the doubler output terminals T5 and a collector coupled to a suitable voltage via a resistor. In these cases the disconnecting signal is active if it has a low level. The transistor Tr1,Tr1' may also be a FET. The zener diodes Z2,Z2' used in an over-voltage detector may be replaced by a resistor.

In brief the invention is summarized below. Prior art voltage doublers 2 comprise a series arrangement of two smoothing capacitors C1,C2 having a rated voltage which is chosen at least twice higher than the maximum operating voltage occurring across each smoothing capacitor C1,C2 in normal operation. If one of the smoothing capacitors C1,C2 is short-circuited, the other one of the smoothing capacitors C1,C2 can cope with the voltage across it which is about twice as high. The invention is able to use less expensive smoothing capacitors C1,C2 having a far lower rated voltage which is only slightly above the maximum voltage occurring during normal operation. To this end, a first and a second over-voltage prevention circuit 30,31 are coupled across the smoothing capacitors C1,C2 of the voltage doubler 2 to protect the smoothing capacitors C1,C2 against over-voltage if one of the smoothing capacitors C1,C2 is short-circuited. The first and the second over-voltage prevention circuit 30,31 may both be an over-voltage detector or an under-voltage detector each being coupled across one of the smoothing capacitors C1,C2. It is also possible to combine an over-voltage detector coupled across one of the smoothing capacitors C1,C2 with an under-voltage detector coupled across the same smoothing capacitor C1,C2. The overvoltage detector prevents an over-voltage across said one smoothing capacitor C1,C2 if the other smoothing capacitor C1,C2 is a short circuit. The under-voltage detector detects a short circuit of the one smoothing capacitor C1,C2 and thereby prevents an over-voltage across the other.

We claim:

1. A power supply input circuit (1,2,3) comprising
   a disconnecting circuit (1) coupled to receive an AC-input voltage (Vac) and a disconnecting signal (Vd) for disconnecting the AC-input voltage (Vac) from output terminals (T1,T2) of the disconnecting circuit (1) if the disconnecting signal (Vd) is active,
   a series arrangement of a first and a second smoothing capacitor (C1,C2) coupled between output terminals (T3,T4) of the power supply input circuit (1,2,3),
   a voltage doubler circuit (20) coupled to said output terminals (T1,T2) for supplying a rectified output voltage across the series arrangement of the first and the second smoothing capacitor (C1,C2) in a first situation where no voltage doubling is required, and for supplying one polarity of the AC-input voltage (Vac) across said first smoothing capacitor (C1) and the other polarity of the AC-input voltage (Vac) across said second smoothing capacitor (C2), to provide a doubled rectified output voltage across the series arrangement of the first and the second smoothing capacitor (C1,C2) in a second situation where a voltage doubling is required, and
   an over-voltage detection circuit (3) having an output for supplying the disconnecting signal (Vd),
   characterized in that
   the over-voltage detection circuit (3) comprises a first over-voltage prevention circuit (30) to detect an over-voltage across said first smoothing capacitor (C1), and a second over-voltage prevention circuit (31) to detect an over-voltage across said second smoothing capacitor (C2), the over-voltage detection circuit (3) activating the disconnecting signal (Vd) if an over-voltage is detected across at least one of said smoothing capacitors (C1,C2).

2. A power supply input circuit as claimed in claim 1, characterized in that the first over-voltage prevention circuit (30) includes a first over-voltage detector which is coupled across the first smoothing capacitor (C1) to activate the disconnecting signal (Vd) if a voltage across the first smoothing capacitor (C1) is above a certain level, and the second over-voltage prevention circuit (31) includes a second over-voltage detector which is coupled across the second smoothing capacitor (C2) to activate the disconnecting signal (Vd) if a voltage across the second smoothing capacitor (C2) is above a certain level.

3. A power supply input circuit as claimed in claim 1, characterized in that the first over-voltage prevention circuit (30) includes a first under-voltage detector which is coupled across the first smoothing capacitor (C1) to activate the disconnecting signal (Vd) if a voltage across the first smoothing capacitor (C1) is below a certain value, and the second over-voltage prevention circuit (31) includes a second under-voltage detector which is coupled across the second smoothing capacitor (C2) to activate the disconnecting signal (Vd) if a voltage across the second smoothing capacitor (C2) is below a certain value.

4. A power supply input circuit as claimed in claim 1, characterized in that the first over-voltage prevention circuit (30) includes an over-voltage detector which is coupled across one of the smoothing capacitors (C1,C2) to activate the disconnecting signal (Vd) if a certain voltage across said one of the smoothing capacitors (C1,C2) is above a certain level, and the second over-voltage prevention circuit (31) includes an under-voltage detector which is coupled across said one of the smoothing capacitors (C1,C2) to activate the disconnecting signal (Vd) if the voltage across said one of the smoothing capacitors (C1,C2) is below a certain value.

5. A power supply input circuit as claimed in claim 4, characterized in that one terminal of said one (C1) of the smoothing capacitors (C1,C2) is coupled to ground.

6. A power supply input circuit as claimed in claim 2, characterized in that the over-voltage detector comprises a parallel arrangement of two series-arranged resistors (R1,R2;R1',R2') and a series arrangement of a zener diode (Z2;Z2') and a third resistor (R3;R3'), the parallel arrangement being coupled across one of the smoothing capacitors (C1,C2), in that a base of a bipolar transistor (Tr1;Tr1') is coupled to a junction of the two resistors (R1,R2;R1',R2'), and an emitter of the bipolar transistor (Tr1;Tr1') is coupled to a junction of the third resistor (R3;R3'), and in that the zener diode (Z2;Z2') is oriented in such a way that an emitter current flowing in the emitter of the bipolar transistor (Tr1;Tr1') flows from cathode to anode of the zener diode (Z2;Z2'), and in that a collector of the bipolar transistor (Tr1;Tr1') is connected to the output of the over-voltage detection circuit (3) to supply the disconnecting signal (Vd).

7. A power supply input circuit as claimed in claim 2, characterized in that the over-voltage detection circuit (3) is adapted not to supply an active disconnecting signal (Vd) to the disconnecting circuit (1) if the over-voltage detected by the over-voltage detector occurs during a period which is too short to cause a failure of one of the smoothing capacitors (C1,C2).

8. A power supply input circuit as claimed in claim 7, characterized in that a smoothing circuit (R5,C4) is coupled between the output of the over-voltage detection circuit (3) and the disconnecting circuit (1).

9. A power supply input circuit as claimed in claim 7, characterized in that the over-voltage detector comprises a parallel arrangement of two series-arranged resistors (R1, R2;R1',R2') and a series arrangement of a zener diode (Z2;Z2') and a third resistor (R3;R3'), the parallel arrangement being coupled across one of the smoothing capacitors (C1;C2), in that a base of a bipolar transistor (Tr1;Tr1') is coupled to a junction of the two resistors (R1,R2;R1',R2'), and an emitter of the bipolar transistor (Tr1;Tr1') is coupled to a junction of the third resistor (R3;R3'), and in that the zener diode (Z2;Z2') is oriented in such a way that an emitter current flowing in the emitter of the bipolar transistor (Tr1;Tr1') flows from cathode to anode of the zener diode (Z2;Z2'), in that a collector of the bipolar transistor (Tr1;Tr1') supplies the disconnecting signal (Vd), and in that a capacitor (C3;C3') is coupled between the base of the bipolar transistor (Tr1;Tr1') and a connection point of the zener diode (Z2;Z2') which is not coupled to the emitter of the bipolar transistor (TR1;TR1').

10. A picture display apparatus comprising:

a power supply input circuit (1,2,3) as claimed in claim 1, a main power supply (4) coupled to the output terminals (T3,T4) of the power supply input circuit (1,2,3) to supply at least one stabilized output voltage (Vs), and a horizontal addressing circuit (5) receiving said stabilized output voltage (Vs) to supply a horizontal addressing signal (Hadr) for determining a horizontal position on a display device 6 and a vertical addressing signal (Vadr) for determining a vertical position on the display device (6).

11. An over-voltage protection method of protecting smoothing capacitors (C1,C2) in a voltage doubler (2), the voltage doubler (2) receiving an AC-input voltage (Vac) and comprising a series arrangement of two smoothing capacitors (C1,C2) coupled between output terminals (T3,T5,T4) of the voltage doubler (2), while in a first situation where no voltage doubling is required, the voltage doubler (2) supplies a rectified output voltage across the series arrangement of the two smoothing capacitors (C1,C2), and while in a second situation where a voltage doubling is required, the voltage doubler (2) supplies one polarity of the AC-input voltage across one of the smoothing capacitors (C1,C2) and supplies the other polarity of the AC-input voltage across the other smoothing capacitor (C1,C2) to provide a doubled rectified voltage across the series arrangement of the two smoothing capacitors (C1,C2), the method comprising the steps of:

detecting (3) an over-voltage, generating an active disconnecting signal (Vd) if an over-voltage is detected, and disconnecting (1) the AC-input voltage (Vac) from the voltage doubler (2) in response to the active disconnecting signal (Vd), characterized in that the detection (3) of the over-voltage situation comprises the steps of:

detecting (30) an over-voltage across said first smoothing capacitor (C1), detecting (31) an over-voltage across said second smoothing capacitor (C2), and furnishing said disconnecting signal (Vd) if an over-voltage across at least one of said first and said second smoothing capacitors (C1,C2) is detected.

* * * * *